United States Patent [19]
Satoh

[11] Patent Number: 5,092,998
[45] Date of Patent: Mar. 3, 1992

[54] DEVICE FOR TREATING OIL SLUDGE AND OIL-CONTAINING WASTE WATER

[76] Inventor: Yukimasa Satoh, 5-22, Jindaiji-higashimachi 6-chome, Chofu City, Tokyo, Japan

[21] Appl. No.: 680,057

[22] Filed: Apr. 3, 1991

Related U.S. Application Data

[62] Division of Ser. No. 592,274, Oct. 3, 1990.

[30] Foreign Application Priority Data

Apr. 9, 1990 [JP] Japan ................ 2-99295

[51] Int. Cl.$^5$ ............ B01D 17/04; B01D 17/038
[52] U.S. Cl. ................ 210/257.1; 210/512.2; 210/186; 210/188; 209/149; 209/211; 204/149
[58] Field of Search ........... 210/257.1, 512.2, 770, 210/771, 186, 188, 787, 806, 737, 785, 708; 209/149, 211; 208/13, 187; 204/186, 188, 190, 98, 149, 68; 134/26, 27, 28

[56] References Cited

U.S. PATENT DOCUMENTS

| | | | |
|---|---|---|---|
| 3,787,315 | 1/1974 | Bearden, Jr. et al. | 204/68 |
| 4,194,972 | 3/1980 | Weintraub et al. | 210/708 |
| 4,501,671 | 2/1985 | Bazell | 210/804 |
| 4,938,876 | 7/1990 | Ohsol | 210/708 |
| 4,938,877 | 7/1990 | Bock et al. | 210/732 |

Primary Examiner—Robert A. Dawson
Assistant Examiner—David Reifsnyder
Attorney, Agent, or Firm—Lorusso & Loud

[57] ABSTRACT

A mixture of an oil sludge and an oil-contained waste water is first separated into a first oil-contained water and an oily dust containing metal-contained dust, fine metal powder and small fragments. Secondly, the oily dust is washed and separated into a harmless oil-free dust and a second oil-contained water containing the metal. Finally, both the first and second oil-contained water are separated into oil, harmless water and metal hydroxide by electrolysis. Thus, the mixture of the oil sludge and the oil-contained waste water is separated into components, which are in turn recovered, recycled, or converted into new materials, and the purification of the waste water can be realized.

6 Claims, 4 Drawing Sheets

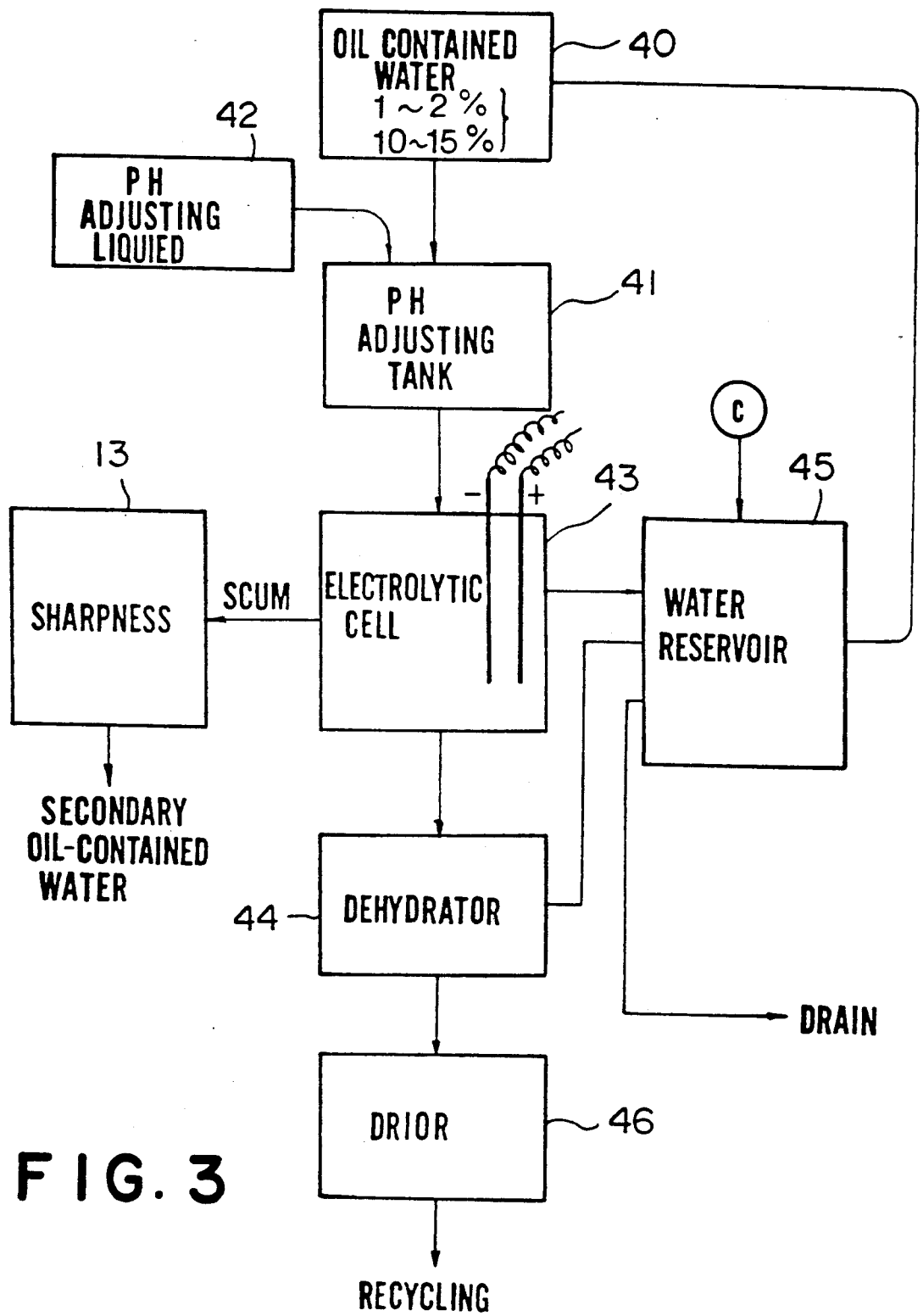
F I G. 3

DEVICE FOR TREATING OIL SLUDGE AND OIL-CONTAINING WASTE WATER

This application is a division of application Ser. No. 07/592,274, filed Oct. 3, 1990.

BACKGROUND OF THE INVENTION

The present invention relates to a method and device for treating an oil sludge and an oil-contained waste water which are generated in the process of transportation, refining, storage or usage of petroleum.

Generally, industrial waste treating companies are entrusted to treat an oil tank sludge or a crude oil tanker sludge from oil refining companies in oil producing countries or oil consuming countries, an engine oil from machine repairing shops, and a transformer oil from power distributing companies. If such an oil sludge is incinerated, a harmful gas such as SOx, NOx and COx is diffused in the atmosphere to cause acid rain which will damage forest and also cause photochemical smog which will lead to infant asthma.

If the oil sludge is thrown away in the ground, a light oil contained in the oil sludge is vaporized by a solar heat and a ground heat (in case of desert or soil), and is diffused in the atmosphere to cause photochemical smog. On the other hand, a heavy oil contained in the oil sludge is penetrated into the ground together with rain water to cause soil pollution in a wide area. Further, the heavy oil flows into a ground water to cause pollution of the ground water.

The oil in the oil sludge can be recovered by separating the same from the water in the oil sludge. However, a process of separating the oil from the water in the form of an emulsion is difficult to conduct.

The present inventor has already proposed a sewage treating method and device as mentioned below.

In Japanese Patent Laid-open Publication No. 48-59658, a sewage such as domestic is adjusted to pH (hydrogen ion concentration) $7.0\pm0.5$, and is then filtered by zeolite to remove color, odor and metal. In electrolyzing the pH adjusted liquid, aluminum is used for anode and cathode, and the polarity of both the electrodes is changed to prevent deposition of metal hydroxide onto the electrodes and thereby accelerate the electrolysis.

In Japanese Patent Laid-open Publication No. 49-32462, a sewage is sprayed to contact a blowing purified air, thereby separating oil from the sewage and oxidatively deodorizing the same. Then, pH of the sewage is adjusted to 5.5-7.0. Thereafter, the sewage is fed to a plurality of electrolytic cells communicated with each other to conduct electrolysis by using aluminum as anode and cathode as changing the polarity of both the electrodes.

Thus, the sewage such as industrial and domestic can be treated by the above sewage treating method and device. However, the oil sludge containing 30% or more of heavy oil cannot be treated.

Accordingly, there is a problem that the pollution of the atmosphere and the ground water cannot be prevented by the above conventional treating method and device.

SUMMARY OF THE INVENTION

It is an object of the present invention to provide a method and device for treating an oil sludge and an oil-containing waste water which separates such an oil sludge into oil, water and dust to be subjected to recovery, recycle or conversion into new materials without incinerating the oil sludge and without throwing away the same into the ground.

According to one aspect of the present invention, there is provided a method of treating an oil sludge and an oil-containing contained waste water, comprising the steps of heating a mixture of said oil sludge and said oil-containing waste water to give a fluidity thereto; feeding said mixture to a flashing vessel having an inner pressure maintained at less than atmospheric pressure to vaporize off a part of water and a light oil and obtain a sludge containing an oil-containing dust, heavy oil component and residual water; cooling a vapor of said part of water and said light oil to condense said vapor and separate said part of water from said light oil and recovering said part of water and said light oil; separating said sludge into said oil-containing dust and a primary oil-containing water comprised of said heavy oil component and said residual water by means of a first centrifugal separator; separating said primary oil-containing water into said heavy oil component and said residual water as a secondary oil-containing water by means of a second centrifugal separator and recovering said heavy oil component; washing said oil-containing dust separated by said first centrifugal separator by using a washing water to elute oil attached to said oil-containing dust into said washing water and thereby obtain an oil-free dust and an emulsion; separating said oil-free dust from said emulsion by means of a third centrifugal separator; washing said oil-free dust by using an acidic water, then washing said oil-free dust by using an alkaline water, and finally washing said oil-free dust by using a neutral water to obtain a water-containing dust and a waste washing water; separating said water-containing dust from said waste washing water by means of a fourth centrifugal separator to recover said water-containing dust; adding a pH adjusting liquid to a mixture of said secondary oil-containing water, said emulsion and said waste washing water to adjust a pH value of said mixture; electrolyzing said mixture after adjustment of the pH value in an electrolytic cell to separate the same into a scum containing said emulsion generated at an upper portion of said electrolytic cell, a sedimented substance containing a metal hydroxide generated at a lower portion of said electrolytic cell, and a residual liquid generated at an intermediate portion of said electrolytic cell; returning said scum to said second centrifugal separator to treat the same; recovering said metal hydroxide; and discharging said residual liquid.

According to another aspect of the present invention, there is provided a device for treating an oil sludge and an oil-contained waste water, comprising a first heat exchanger for heating a mixture of said oil sludge and said oil-containing waste water to give a fluidity thereto; a flashing vessel for vaporizing a part of water and a light oil contained in said mixture under a low vacuum; a second heat exchanger for cooling a vapor of said part of water and said light oil to condense said vapor and separate said part of water from said light oil; a first centrifugal separator for separating a sludge left in said flashing vessel and a primary oil-containing water comprised of a heavy oil component and a residual water; a second centrifugal separator for separating said primary oil-containing water into said heavy oil component and said residual water as a secondary oil-containing water; a first washing water for washing said oil-containing dust separated by said first centrifugal separator to elute oil attached to said oil-containing dust into said washing water and thereby obtain an oil-free dust and an emulsion; a third centrifugal separator for separating said oil-free dust from said emulsion; a second washing water for washing said oil-free dust to obtain a water-containing dust and a waste washing water, said second washing water being comprised of an acidic water, an alkaline water and a neutral water; a fourth centrifugal separator for separating said water-containing dust from said waste washing water; a pH adjusting liquid for adjusting a pH value of a mixture of said secondary oil-containing water, said emulsion and said waste washing water; an electrolytic cell for electrolyzing said mixture after adjustment of the pH value to generate a hydrogen gas at a cathode and an oxygen gas and a metal hydroxide at an anode; and a dehydrator for dehydrating said metal hydroxide.

In summary, a mixture of an oil sludge and an oil-contained waste water is first separated into a first oil-containing water and an oily dust containing metal-contained dust, fine metal powder and small fragments. Secondly, the oily dust is washed and separated into a harmless oil-free dust and a second oil-containing water containing the metal. Finally, both the first and second oil-containing water are separated into oil, harmless water and metal hydroxide by electrolysis. Thus, the mixture of the oil sludge and the oil-containing waste water is separated into components, which are in turn recovered, recycled, or converted into new materials, and the purification of the waste water can be realized.

Other objects and features of the invention will be more fully understood from the following detailed description and appended claims when taken with the accompanying drawings.

BRIEF DESCRIPTION OF THE DRAWINGS

FIGS. (1A and 1B) represent a flow diagram showing the first stage of the treatment process according to the present invention;

FIG. 3 is a flow diagram showing the third stage of the treatment process according to the present invention.

DETAILED DESCRIPTION OF THE PREFERRED EMBODIMENT

Figure 1A:
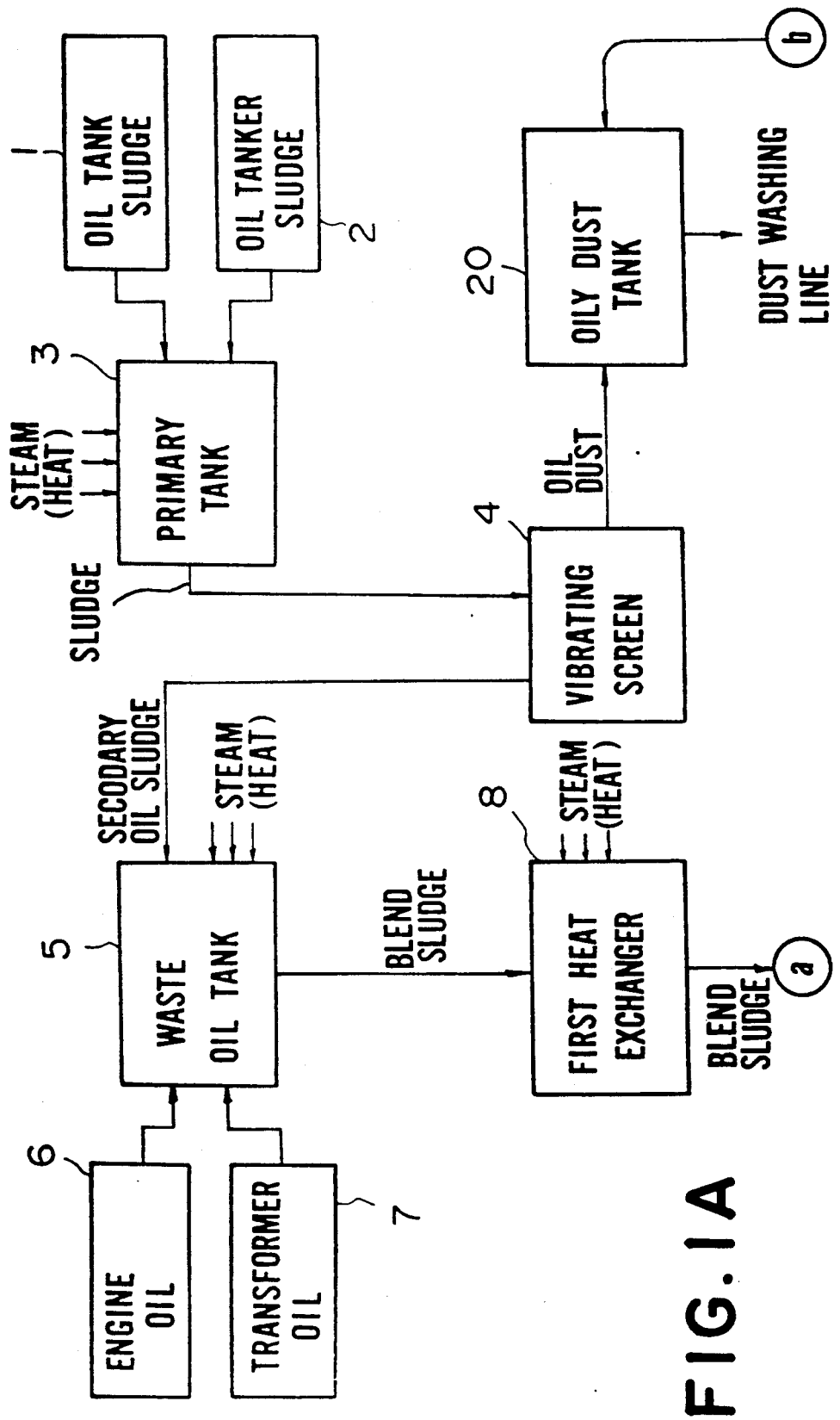

Generally, an oil tank sludge in a crude oil tank (including A-oil, B-oil and C-oil) has the following components.
oil: 30-35%
water: 50-40%
dust: 20-25%.

Further, a crude oil tanker sludge has the following components.
oil: 40-45%
water: 30-25%
dust: 20%.

These tank sludge and tanker sludge have a transparency of about 2 cm or less.

Such a sludge is a blackish brown dense solution containing an oil-containing water and dust mixed with each other.

The dust contains a fine quantity of metals such as iron, cadmium, manganese, magnesium and lead. These metals are taken with oil from an oil well.

A waste oil is classified into an engine oil and a transformer oil. The engine oil to be discharged upon oil exchange contains water and fine metal powder generated due to wear of a cylinder. On the other hand, the transformer oil contains water and small fragments of a solid adhesive.

In the preferred embodiment, the oil tank sludge, the oil tanker sludge and the waste oil will be referred generally to as an oil sludge.

The treatment process of the present invention is generally comprised of the three stages of first separating the oil sludge into a first oil-contained water and an oily dust containing metal-containing dust, fine metal powder and small fragments as mentioned above, secondly washing the above oily dust to separate the same into a harmless oil-free dust and a second oil-containing water containing the above metal, and finally separating both the first and second oil-containing water into oil, harmless water and metal hydroxide.

There will now be described a preferred embodiment of the present invention with reference to the drawings. Referring to FIGS. (1a and 1b) which shows the first stage of the treatment process according to the present invention, an oil tank sludge 1 and an oil tanker sludge 2 are thrown into a primary tank 3 as a recovery oil tank, and they are heated by steam S at 40°-60° C. to reduce viscosity of the primary oil sludge and give a fluidity thereto.

The primary oil sludge is fed onto a vibrating screen 4 by a pump to separate off a rough dust having a particle size of 5 to 1 mm. A secondary oil sludge having passed through the vibrating screen 4 is fed to a waste oil tank 5. The oily dust left on the vibrating screen 4 is fed to an oily dust tank 20 connected to a dust washing line which will be hereinafter described.

On the other hand, an engine oil 6 and a transformer oil 7 are also thrown into the waste oil tank 5, and they are heated by steam S at 40°-60° C. to reduce the viscosity of the waste oil and give a fluidity thereto. In the waste oil tank 5, the secondary oil sludge and the waste oil are blended to obtain a fluidic blend sludge. The blend sludge is fed to a first heat exchanger 8 for heating. The first heat exchanger 8 is supplied with steam S to heat the blend sludge at an inlet temperature of 40°-45° C. and at an outlet temperature of 60°-90° C. After passing through the first heat exchanger 8, the blend sludge is fed through a pipe to a flashing vessel 9.

An inner pressure of the flashing vessel 9 is maintained under a low vacuum, e.g., 300-500 mmHg by using an external vacuum pump (not shown). Accordingly, a volatile light oil vapor (gasoline) and a part of water vapor in the blend sludge fed to the flashing vessel 9 are fed through an exhaust pipe to a second heat exchanger 11 for cooling. The second heat exchanger 11 is cooled by a flowing water having a temperature of 20°-18° C., and the light oil vapor and the water vapor are therefore condensed. Thus, the light oil (gasoline) and the water are stored at an upper portion and a lower portion of the second heat exchanger 11, respectively. The light oil at the upper portion is fed by gravity to a light oil tank 10, while the water at the lower portion is fed to a water reservoir 45 for the purpose of recycling or discharging.

The residual viscous oily dust having an increased content of dust collected in the bottom portion of the flashing vessel 9 is fed as a tertiary oil sludge to a first decanter 12 as the first centrifugal separator of the present invention by using a pump. The first decanter 12 is rotated at a low speed of 3,000–5,000 RPM to separate the tertiary oil sludge into a primary oil-containing water and an oily dust having a small particle size in accordance with a difference in specific gravity by a centrifugal force. At this time, since the oily dust having a relatively large particle size has been already separated off by the vibrating screen 4, there is no possibility that the scattering oily dust in the first decanter 12 will damage an inner wall of the first decanter 12. The oily dust is almost separated off by sedimentation in the first decanter 12, and it is then fed to the oily dust tank 20. On the other hand, the residual primary oil-containing water is fed to a vessel 13 as the second centrifugal separator of the present invention. The vessel 13 is rotated at a high speed of 15,000–36,000 RPM to separate the primary oil-containing water into a heavy oil and a secondary oil-containing water containing 21% of oil. The heavy oil is fed as a regenerative oil to an oil reservoir 30, while the secondary oil-contained water is fed to an oil-containing water tank 40 connected to a water treatment line which will be hereinafter described.

Figure 2:
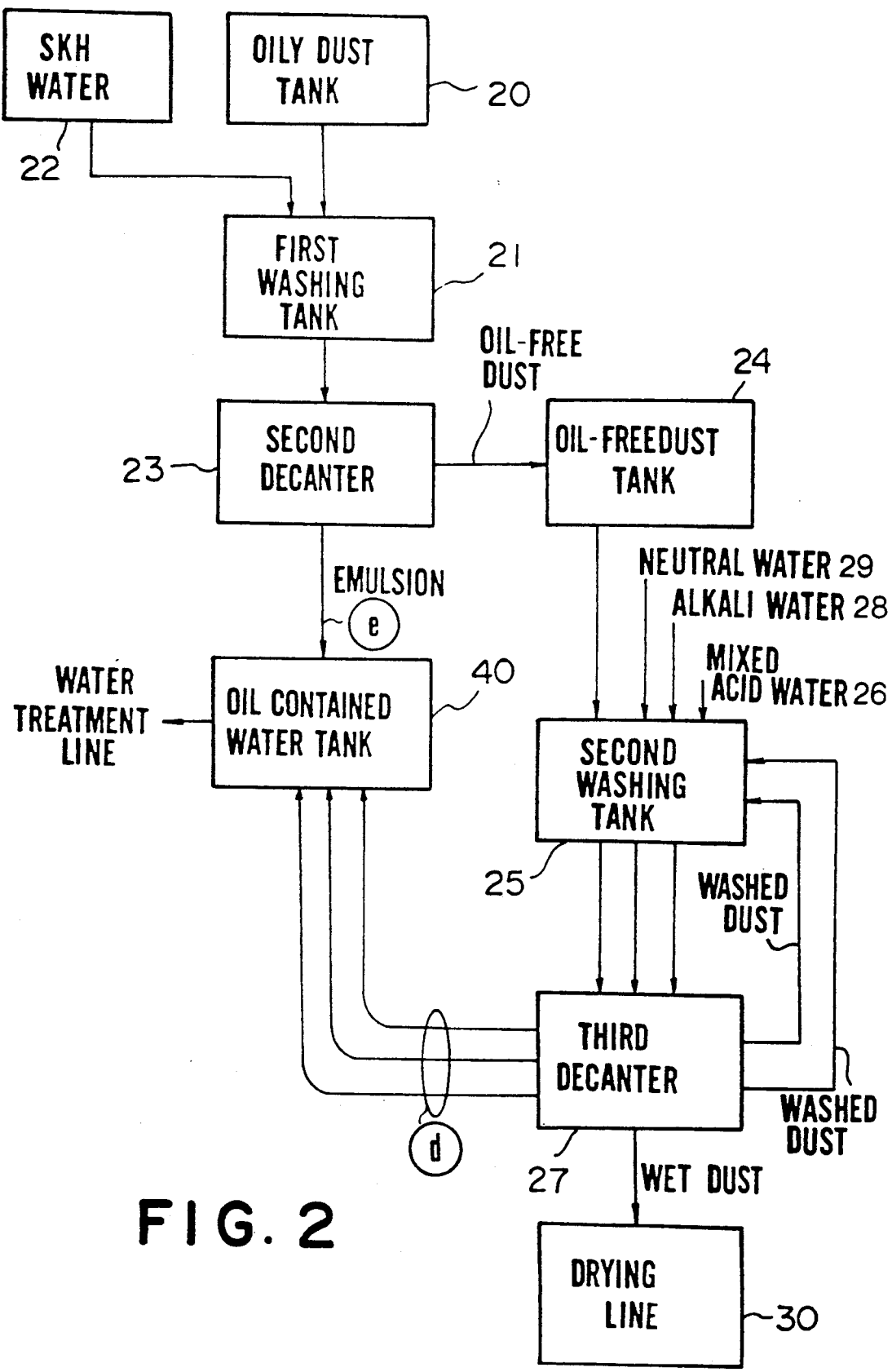
FIG. 2 is a flow diagram showing the second stage of the treatment process according to the present invention.

The oily dust collected in the oily dust tank 20 contains 10–15% by weight of oil, and it is accordingly fed to the dust washing line as shown in FIG. 2.

Referring to FIG. 2 which shows the second stage of the treatment process according to the present invention, the oily dust is fed from the oily dust tank 20 to a first washing tank 21, and 70% by weight of a SKH wash 22 is added to 30% by weight of the oily dust in the first washing tank 21, thereby washing the oily dust with stirring. The SKH water 22 is a solvent having a hydrophilic group which is readily bonded to and a lipophilic group which is readily bonded to oil. Therefore, the oil attached to the dust is bonded to the lipophilic group by washing the oily dust with the SKH 22, and the oil content in the dust is reduced to a trace of 0.01% or less. Thus, the oil attached to the dust substantially completely migrates to the SKH 22 to form an emulsion. Then, a mixture of the oil-free dust and the emulsion as obtained above is separated into the oil-free dust and the emulsion by a second decanter 23 as the third centrifugal separator of the present invention. The emulsion is fed to the oil-contained water tank 40, while the oil-free dust is fed to an oil-free dust tank 24.

The oil-free dust is fed from the oil-free dust tank 24 to a second washing tank 25, and a mixed acid water 26 is first added to the oil-free dust in the second washing tank 25 to wash the same with stirring. Then, a mixture of the acid water 26 and the oil-free dust is separated into a waste acidic water and a primary washed dust by a third decanter 27. The waste acidic water is fed to the oil-containing water tank 40, while the primary washed dust is returned to the second washing tank 25.

Secondly, an alkali water 28 is added to the primary washed dust returned to the second washing tank 25 to wash the same with stirring. Then, a mixture of the alkali water 28 and the primary washed dust is separated into a waste alkaline water and a secondary washed dust by the third decanter 27. The waste alkaline water is fed to the oil-containing water tank 40, while the secondary washed dust is returned to the second washing tank 25.

Finally, a neutral water 29 is added to the secondary washed dust returned to the second washing tank 25 to wash the same with stirring. Then, a mixture of the neutral water 29 and the secondary washed dust is separated into a waste neutral water and tertiary washed dust by the third decanter 27. The waste neutral water is fed to the oil-containing water tank 40, while the tertiary washed dust is fed to a drying line 30.

The tertiary washed dust is dehydrated to a water content of 30% or less in the drying line 30. This dust may be thrown away on open land or used for reclaiming since the dust finally obtained is harmless.

Figure 1B:
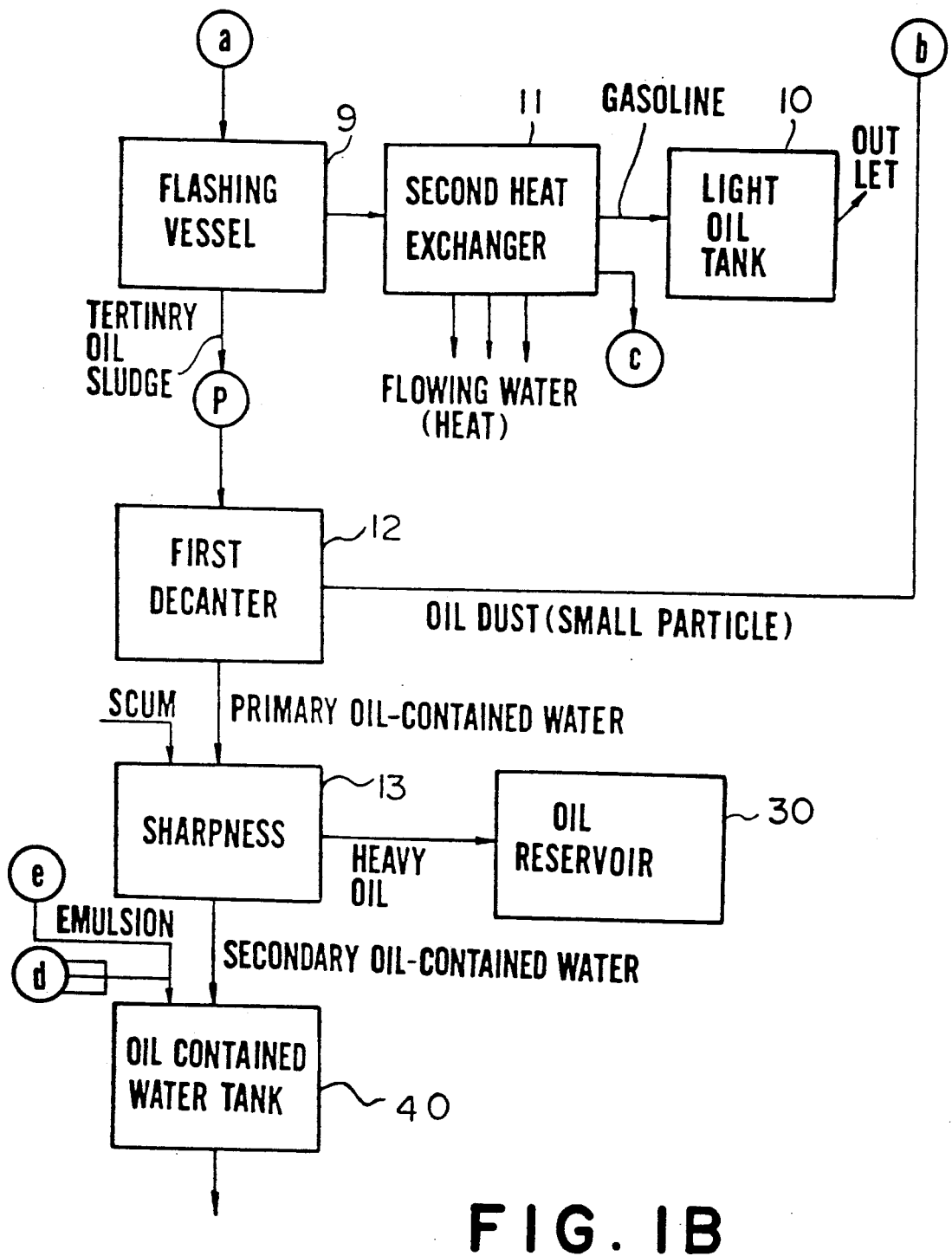

After the secondary oil-containing water as shown in FIG. 1, the emulsion, the waste acidic water, the waste alkaline water and the waste neutral water (these waste waters will been hereinafter referred generally to as a waste washing water) as shown in FIG. 2 are fed to the oil-containing water tank 40, they are fed to the water treatment line as shown in FIG. 3.

Referring to FIG. 3 which shows the third stage of the treatment process according to the present invention, a mixture of the secondary oil-containing water, the emulsion and the waste washing water in the oil-containing water tank 40 is fed to a pH adjusting tank 41, and a pH adjusting liquid 42 is added to the mixture in the pH adjusting tank 41 as stirring to adjust a pH value of the mixture to a predetermined value. After adjustment of the pH value, the mixture is allowed to stand for a while.

The above mixture of the secondary oil-containing water, the emulsion and the waste washing water contains various metals, which have been present in the original dust, such as antimony Sb, arsenic As, barium Ba, beryllium Be, cadmium Cd, chromium Cr(VI), Cr(III), cobalt Co, copper Cu, lead Pb, mercury Hg, molybdenum Mo, nickel Ni, selenium Se, silver Ag, thallium Tl, vanadium V and zinc Zn.

These metals are combined with OH in the above mixture and the pH adjusting liquid to form a metal hydroxide having a coagulating ability. The metal hydroxide coagulates fine impurities such as organic substance and inorganic substance still finely residing in the above mixture to form a coagulated substance of the metal hydroxide and the fine impurities. The coagulated substance is sedimented at a lower portion of the pH adjusting tank 41.

The coagulated substance containing the metal hydroxide and the pH adjusting liquid is fed from the bottom of the pH adjusting tank 41 to an electrolytic cell 43. In the electrolytic cell 43, water-soluble aluminum Al is used for a cathode and an anode, and a voltage of DC 3–10 V is applied. At the cathode, a hydrogen gas is generated in accordance with the reaction of $H_2O \rightleftharpoons H^+ + (OH)^-$, $2H^+ + 2e^- \rightarrow H_2$. The bonding between the SKH 22 and the oil of the emulsion is cut by a part of the hydrogen gas, and the residual hydrogen gas is attached to the oil to float the same up to an upper portion of the electrolytic cell 43, thus forming a scum. The scum is fed to the vessel 13 as the second centrifugal separator shown in FIG. 1, and is separated into oil and water by the vessel 13.

At the anode of the electrolytic cell 43, $Al^{3+}$ is eluted from the Al electrode plate to react with $(OH)^-$ present in the electrolyte and form an aluminum hydroxide in accordance with the reaction of $Al^{3+} + 3(OH)^- \rightarrow Al(OH)_3$.

The aluminum hydroxide serves as a coagulant to coagulate fine impurities such as organic substance and inorganic substance still finely residing in the electrolyte to form a coagulated substance. The coagulated substance is sedimented at a lower portion of the electrolytic cell 43. Simultaneously, the coagulated substance containing the metal hydroxide fed from the pH adjusting tank 41 is also sedimented at the lower portion of the electrolytic cell 43. Then, these coagulated substances containing the aluminum hydroxide and the metal hydroxide are fed from the electrolytic cell 43 to a dehydrator 44.

A liquid present at an intermediate layer between the upper layer of the scum and the lower layer of the coagulated substances in the electrolytic cell 43 is a substantially clarified water, and the liquid is fed to the water reservoir 45.

In the dehydrator 44, the coagulated substances containing the aluminum hydroxide and the metal hydroxide are dehydrated and separated into water and dehydrated cake. The water is fed to the water reservoir 45, while the dehydrated cake is fed to a drier 46. In the drier 46, the dehydrated cake is dried to a water content of 30% or less, thus forming metal oxide, which is subjected to recycling of metal.

Although the water in the water reservoir 45 has been already clarified, there is a fear that a part of the water residing at the lower portion of the water reservoir 45 contains a small amount of sludge. Therefore, the water is fed again to the oil-contained water tank 40 of the water treatment line.

Before the treatment by the water treatment line, the oil-containing water in the oil-contained water tank 40 has COD of 12,000-5,000 ppm, BOD of 8,500-3,500 ppm, SS of 1,000-500 ppm, n-Hex extract (oil) of 2,000-1,000 ppm, and transparency of 25-35 cm. In contrast, after the treatment, the water to be discharged from the water reservoir 45 has COD of 20 ppm or less, BOD of 27-68 ppm, SS of 10 or less, n-Hex extract (oil) of 5 ppm or less, pH of 7±1, transparency of 100 cm or more, and E. coli of trace.

Thus, the water to be discharged from the water reservoir 45 is harmless, and it is accordingly discharged to a river or subjected to recycling (the neutral washing water for the dust). The oil recovered is reused.

While the invention has been described with reference to a specific embodiment, the description is illustative and is not to be construed as limiting the scope of the invention. Various modifications and changes may occur to those skilled in the art without departing from the spirit and scope of the invention as defined by the appended claims.

What is claimed is:

1. A device for treating an oil sludge and an oil-containing waste water, comprising a first heat exchanger for heating a mixture of said oil sludge and said oil-containing waste water to give a fluidity thereto; a flashing vessel for vaporizing a part of water and a light oil contained in said mixture under a low vacuum; a second heat exchanger for cooling a vapor of said part of water and said light oil to condense said vapor and separate said part of water from said light oil; a first centrifugal separator for separating a sludge left in said flashing vessel and a primary oil-containing water comprised of a heavy oil component and a residual water; a second centrifugal separator for separating said primary oil-containing water into said heavy oil component and said residual water as a secondary oil-containing water; a first water wash means for washing said oil-containing dust separated by said first centrifugal separator to elute oil attached to said oil-containing dust into said washing water and thereby obtain an oil-free dust and an emulsion; a third centrifugal separator for separating said oil-free dust from said emulsion; a second water wash means for washing said oil-free dust to obtain a water-containing dust and a waste washing water; a fourth centrifugal separator for separating said water-containing dust from said waste washing water; pH adjusting means for adjusting a pH value of a mixture of said secondary oil-containing water, said emulsion and said waste washing water; an electrolytic cell for electrolyzing said mixture after adjustment of the pH value to generate a hydrogen gas at a cathode and an oxygen gas and a metal hydroxide at an anode; and a dehydrator for dehydrating said metal hydroxide.

2. The device as defined in claim 1, wherein said first heat exchanger is a heater to be supplied with steam.

3. The device as defined in claim 1, wherein said low vacuum in said flashing vessel is provided through said second heat exchanger.

4. The device as defined in claim 1, wherein said second heat exchanger is a cooler to be supplied with a cooling water.

5. The device as defined in claim 1 further comprising a pH adjusting tank for mixing said pH adjusting liquid with said mixture of said secondary oil-containing water, said emulsion and said waste washing water.

6. The device as defined in claim 1 further comprising a drier for drying said metal hydroxide after dehydration.

* * * * *

UNITED STATES PATENT AND TRADEMARK OFFICE
CERTIFICATE OF CORRECTION

PATENT NO. : 5,092,998
DATED : March 3, 1992
INVENTOR(S) : Yukimasa SATOH

It is certified that error appears in the above-identified patent and that said Letters Patent is hereby corrected as shown below:

Col. 1, line 39, after "domestic" insert --drainage--;

line 56, after "industrial" insert --drainage-- and after "domestic" insert --drainage--.

Col. 2, line 7, delete "contained".

Col. 5, line 32 delete "water".

Col. 6, line 60, "-->Al-" should read -- -->Al- --.

Signed and Sealed this

Twentieth Day of July, 1993

Attest:

MICHAEL K. KIRK

Attesting Officer     Acting Commissioner of Patents and Trademarks